Dec. 21, 1971   J. W. EDWARDS   3,629,380
FOAMED SURFACE PATTERNS
Filed Sept. 18, 1969
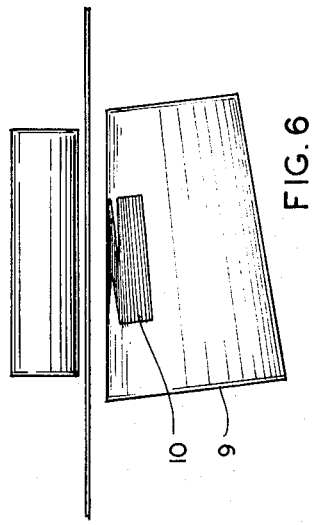
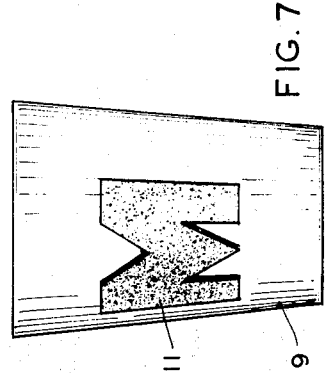
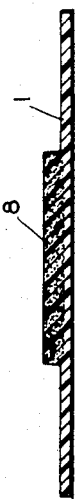
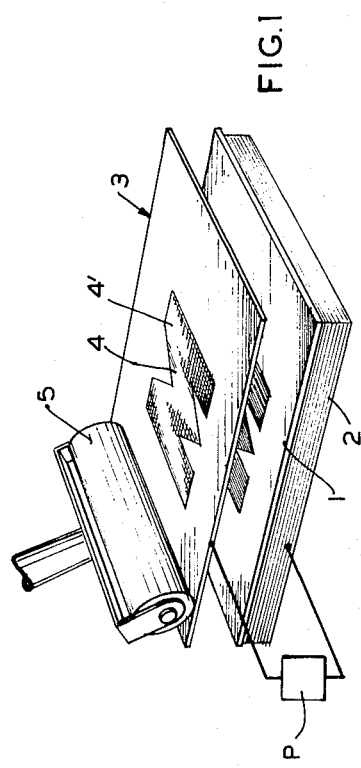
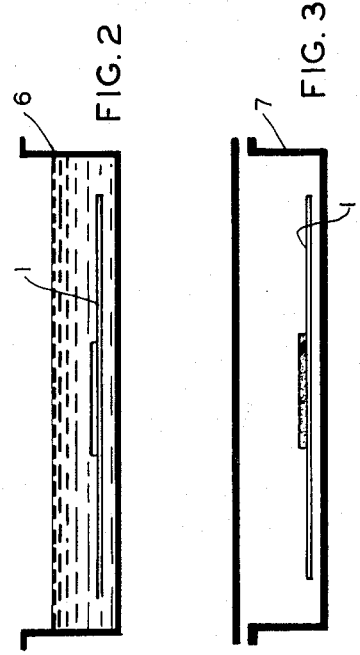
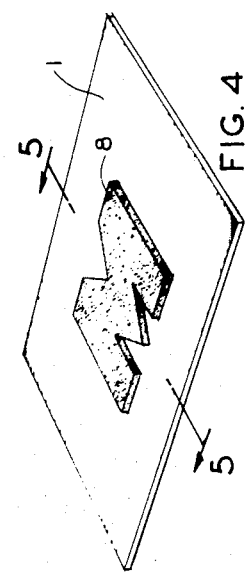
INVENTOR
JAMES W. EDWARDS
BY
*Robert J. Schaap*
ATTORNEY

United States Patent Office

3,629,380
Patented Dec. 21, 1971

3,629,380
FOAMED SURFACE PATTERNS
James W. Edwards, St. Louis, Mo., assignor to
Monsanto Company, St. Louis, Mo.
Filed Sept. 18, 1969, Ser. No. 859,063
Int. Cl. B29d 27/08
U.S. Cl. 264—53    4 Claims

ABSTRACT OF THE DISCLOSURE

A method for producing a foamed image pattern on the surface of a substrate by electrostatically depositing foamable resin particles on the substrate in a desired pattern. The resin particles may preferably be incorporated with a suitable ink to provide the proper color. The substrate is then immersed into a blowing agent and heated in order to expand the resin particles thereby providing an image having a relief with respect to the surface of the substrate.

---

This invention relates in general to certain new and useful improvements in surface patterns, and more particularly to surface patterns which are formed by selective depositing material and causing a relief between image and non-image areas.

There have been a number of well established techniques for producing plastic foams by incorporating a blowing agent or liberating gas material into a thermoplastic resin and subsequently raising the temperature of the resin. Such techniques are illustrated for example in U.S. Patents Nos. 3,300,551 and 3,324,210, and 3,262,625. The heating of the thermoplastic resin generally causes the blowing agent to convert from a solid or liquid state to a gaseous state, thereby expanding the thermoplastic resin to produce a foamed portion of a light density cellular structure. This foamed portion has a lighter density than the original resinous material and generally possesses heat insulating properties as well.

However, while the formation of foamed surfaces has effectively yielded a heat insulating material, and in many cases a sound insulating material as well, there has been no attempt to effectively employ these techniques for decorative purposes or for other utilitarian purposes such as raised images or indicia.

In the art of printing, the practice of forming a raised printing on paper or other substrate such as by thermography is well known. These raised printing practices are effective in replacing the much more expensive technique of engraving. Furthermore, these thermography processes and the like are economical due to the fact that they are less complicated and involve less direct cost than typical engraving processes. In thermography, the printed characters are applied to the substrate by means of an offset press and while the ink remains moist, a powdered mixture is dusted over the printed ink. The powder which adheres to the moistened ink is then fused by exposing the powder to a source of heat at a temperature sufficient to fuse the powder.

It is, therefore, the primary object of the present invention to provide a method of producing raised images by means of selectively foaming resins which have been preincorporated with a blowing agent.

It is another object of the present invention to produce a substrate having a raised image thereon which image can be representative of indicia which is formed to convey desired information.

It is a further object of the present invention to provide a method for producing foamed images of the type stated which method is highly efficient in its operation and economical to perform.

With the above and other objects in view, my invention resides in the novel features of form, construction, arrangement, and combination of parts presently described and pointed out in the claims.

In the accompanying drawings:

FIG. 1 is a schematic perspective view showing a method of electrostatically applying resin particles to the flat surface of a substrate through a stencil screen;

FIG. 2 is a schematic side elevational view showing the substrate with the resin deposited thereon being immersed in a blowing agent;

FIG. 3 is a schematic side elevational view showing the resin carried by the substrate being heated;

FIG. 4 is a perspective view showing the foamed image on the surface of the substrate;

FIG. 5 is a fragmentary sectional view taken along line 5—5 of FIG. 4;

FIG. 6 is a schematic side elevational view showing the technique of electrostatically depositing foamable resin particles on the surface of a conically shaped substrate; and FIG. 7 is a perspective view showing the conically shaped substrate with the raised printed image thereon.

Generally speaking, the present invention relates to a technique for producing a raised image or indicia on a substrate. The image is formed by depositing a foamable resin on the substrate by means of any available printing fixing technique, preferably electrostatic stencil printing. Thereafter, the resin particles are introduced in a suitable blowing agent and heated to expand into a cellular matrix, which raises and forms a relief with respect to the surface of the substrate. In like manner, the ink coating may include substances which would decompose on application of heat and/or radiation to give rise to a foam. For example, good organic substances would reside in diazo compounds. Both a wet ink and a dry ink can be used in the present invention. The resulting image or indicia formed on the substrate can be produced in a very aesthetic manner for decorative purposes of the substrate, and has excellent utilitarian value, such as in producing a braille effect.

Referring now in more detail and by reference characters to the drawings, which illustrate practical embodiments of the present invention, A designates a suitable electrostatic printing system generally comprising a substrate 1 which may be formed of any suitable material such as a metal, paper, paperboard, or any of the well known plastics, etc. If the substrate 1 is formed of a non-conductive material, it is disposed in facewise engagement upon a counterelectrode 2. Disposed in spaced relationship above the surface of the substrate 1 is a stencil screen 3 having a desired image pattern 4 thereon. The stencil screen 3 is formed with an open grid portion or so-called "image portion" 4 and a masked portion 4' in such manner that all portions of the stencil except for the image portion 4 are suitably blocked to a flow of resin particles. The preparation of the stencil does not form part of the present invention and is more fully described in U.S. Letters Patent No. 3,372,639. However, the size of the mesh is such that it enables the resin particles to pass therethrough.

A suitable inking mechanism 5 such as schematically illustrated by the roller in FIG. 1 deposits a suitable resin carrying an electroscopic ink through the open grid portion 4, directly onto the substrate 1. An electrostatic field formed by a suitable source of electrical potential or schematically illustrated by reference letter P is connected between the stencil screen and the counter electrode 2. The resin-ink particles are carried by the electrostatic field to the substrate in the desired image pattern which is being created by the open mesh portion 4 in the stencil screen 3.

It should be understood that other conventional material deposition techniques such as silk screen printing can be employed in place of the electrostatic printing. While other printing techniques are useful and operable in the present invention, electrostatic deposition is preferred since the drying of wet ink is not necessitated and electrostatic deposition provides greater versatility for printing of irregular objects. Furthermore, electrostatic deposition enables the employment of dry resin particles whereas other techniques such as the silk screen printing technique would require a liquid carrier or at least a liquid resin particle. However, in this connection, it should be understood that a liquid resin could be applied as well to the surface of the substrate for foaming. Furthermore, because the resin particles accumulate a slight charge they have a tendency to adhere to the substrate 1 in the manner in which they were deposited, after removal of the electrostatic field.

The powder particles are then fixed by any conventional means well known in the art of electrostatic printing such as by heating. With certain powders, selected wavelengths of radiation can be employed. In like manner, solvent vapor fixing could be employed. The substrate is thereafter deposited in a tank 6 of any conventional construction in the manner as illustrated in FIG. 2 which contains a suitable blowing agent. The substrate 1 is completely submerged into the tank 6 for a short period of time. The blowing agent in the tank 6 is preferably any liquid substance which is (1) absorbable by the resin material deposited on the substrate, and (2) convertible to a gaseous state at a temperature below the melting point temperature of the resin. Some of the liquids which may be employed as blowing agents in the present invention include acetone, pentane, diethyl ketone, methylpropyl ketone, phenol Freon (trichlorofluoro-methane) and the like.

In general, any thermoplastic material may be employed which will foam when incorporated with a blowing agent and subjected to heat. Some of the resins which can be used in the present invention include polymers of styrene, vinyl halide, vinylidene halide, vinyl acetate, acrylic acid esters, methacrylic acid esters, acrylonitrile, ethylene, propylene and higher olefins, isobutylene, fluoro-olefins and chlorofluoro-olefins, as well as copolymers, interpolymers, graft polymers, and chlorinated and chlorosulfonated polymers of the monomers corresponding to the above-mentioned polymeric products and mixtures of the same as well as cellulose acetate or butyrate, ethyl cellulose. A particularly useful resin for deposition is a rubber modified polystyrene or polystyrene which preferably has incorporated therein a rubber compound grafted onto the molecule.

It should also be recognized that the blowing agent could be effectively preincorporated into the resin so that the deposition of the substrate into the tank 6 can be obviated. Any blowing agent which is stable through the fixing or drying step but which will enable foaming upon application of heat can be used. The important criterion being that the blowing agent is such that it will subsequently decompose under the influence of heat and/or radiation and render a gas to enable vaporization or expansion of the resin.

The resin material should have sufficiently small particle size so that it is capable of being deposited by the electrostatic printing techniques such as those described in U.S. Letters Patent 3,081,698. Furthermore, the resin should be selected so that it is chargeable to an extent sufficient for deposition by this technique. The resin particle will generally be combined with a suitable dye or ink material in order to produce the desired color on the substrate.

After the substrate 1 has been removed from the tank 6, it is deposited in an oven 7 in the manner as illustrated in FIG. 3. The resin which has been exposed to the blowing agent is foamed when exposed to the heat. The exposure of the resin to the blowing agent generally requires only a few seconds of maximum absorption depending for the most part on the depth of foam desired, and the depth of resin applied. The exposure time is also a function of the type of blowing agent employed and the respective temperatures of the liquid and the resin material. The operation is suitably carried out by immersing the substrate into the tank 6. However, it should be recognized that any other type of application of the blowing agent to the resin could be employed. In general, the resin should be permitted to dry for a short interval of time before subsequent heating. The drying interval allows deeper diffusion and serves to increase the number of cells and decrease their size. If desired, the drying interval may be accelerated by forced air drafts, moderate heating conditions, etc.

It should also be recognized that it is possible to apply the resin material in the form of a water-based emulsion. When the water has dried, the substrate can then be exposed to the necessary agents for causing the foaming. Water based emulsions can be effectively employed, since they can be conveniently and easily printed onto a substrate in a desired format.

The heating mechanism utilized may vary, the final results being affected by the uniformity of heating, the rate of heating, and temperature level at which it is conducted. The temperature level will, of course, be above the temperature of the blowing agent. Any of the fundamental types of heat transfer, i.e., conduction, convection, and radiation may be utilized. For convenience, convection is generally the preferred mode of heating. In this technique, a preheated gas is circulated within, around, or adjacent the substrate with the resin deposited thereon resulting in a heat transfer from the gas to the resin material. In a situation where the substrate 2 is a biaxially oriented plastic, it may be dsirable to support or affix the substrate dimensionally during the heating operation in order to avoid loss of orientation.

By reference to Figures 4 and 5, it can be seen that the substrate 2 has deposited thereon a raised image portion 8 which is constituted by a cellular foam. Furthermore, it has been found in the practice of the present invention that a rather effective foam structure is created. The foam is rather uniform in that it (1) has a minimum variation of foam depth over the area covered by the foam (2) uniformity of cell size within the foam and (3) a minimum of collapsed and/or distorted cells.

It has been found in connection with the present invention that by abrading the area where it is desired to deposit the resin particles, greater adherence of the resin particles to the surface of the substrate is achieved. The abrading can be conventionally performed by rubbing the surface with a rough tool, sandblasting, a rotary tool abrasive, etc.

Furthermore, it has been found that by abrading the surface of the substrate and thereafter applying the resin particles to the substrate, that in the subsequent foaming operation, only the resin particles will foam where proper heat and time conditions are maintained.

It is also possible to effectively provide a raised printed image on substrates other than nonlinear substrates. For example, FIGS. 6 and 7 illustrate a technique for applying a raised image or indicia on a frustoconical surface. It has been found in connection with the present invention, that it is possible to decorate plastic drinking cups of the type described in U.S. Letters Patent No. 3,374,922. It is possible to electrostatically or otherwise deposit the resin material carrying the ink therein on the substrate in a desired pattern. After the resin material has been deposited in the desired pattern on the substrate, and fixed thereon, it is exposed to the primary liquid and heated in order to provide a raised foamed surface. Naturally, only the resin portion which has been deposited on the drinking cup will be foamed to produce an article of the type as illustrated in FIG. 7.

It can be recognized that the present invention is very effective in producing a raised indicia or series of indicia for utilitarian purposes such as braille effects on linear or nonlinear substrate. In addition, it can be seen that the present invention is effective in producing a decorative effect on articles of all types.

It should be understood that changes and modifications in the form, construction, arrangement, and combination of parts may be made and substituted for those herein described without departing from the nature and principle of my invention.

Having thus described my invention what I desire to claim and secure by Letters Patent is:

1. The process of forming an image on a predetermined surface area of a substrate, said process comprising establishing an electrical field between said substrate and a screen member having a desired image thereon, passing electrically chargeable foamable dry thermoplastic resin particles through said screen and into said electrostatic field depositing said dry resin particles on said substrate in the form of the desired image, said substrate not being foamable under the same conditions as said foamable material, said resin particles being selected from the class consisting of styrene, vinyl halide, vinylidene halide, vinyl acetate, acrylic acid esters, methacrylic acid esters, acrylonitrile, ethylene, propylene, isobutylene and higher olefins, fluoro-olefins and chlorofluoro-olefins, incorporating in said resin particles a blowing agent absorbable by the resin material and convertible to a gaseous state below the melting point temperature of the resin particles, permitting said substrate and resin particles to dry after incorporation of said blowing agent, said blowing agent being selected from the class consisting of acetone, pentane, diethyl ketone, methylpropyl ketone, phenol, and trichlorofluoro-methane and exposing said formable resin particles with said blowing agent incorporated therein to a source of heat to cause said blowing agent to decompose and render a gas to expand said foamable particles and cause securement of said foamable particle to said substrate.

2. The process of claim 1 further characterized in that the foamable particles have incorporated therein a coloring agent.

3. The process of claim 1 further characterized in that the image is in the form of language characters.

4. The process of claim 1 further characterized in that the substrate has a nonlinear surface area with an aesthetic image thereon.

References Cited

UNITED STATES PATENTS

| | | | |
|---|---|---|---|
| 2,827,727 | 3/1958 | Lipsins | 264—45 X |
| 2,920,977 | 1/1960 | Adams | 264—45 X |
| 2,979,246 | 4/1961 | Liebeskind | 264—45 X |
| 3,081,698 | 3/1963 | Childress | 355—17 X |
| 3,144,492 | 8/1964 | Lightner | 264—53 X |
| 3,164,251 | 1/1965 | Easter | 264—45 X |
| 3,285,795 | 11/1966 | Stein | 264—45 X |
| 3,389,199 | 6/1968 | Bushnell | 264—45 X |

JULIUS FROME, Primary Examiner

P. A. LEIPOLD, Assistant Examiner

U.S. Cl. X.R.

117—93.4 A; 264—45, 132